US008680209B2

(12) United States Patent
Honda et al.

(10) Patent No.: US 8,680,209 B2
(45) Date of Patent: Mar. 25, 2014

(54) STABILIZED FLUOROPOLYMER AND METHOD FOR PRODUCING SAME

(71) Applicants: Daikin Industries, Ltd., Osaka (JP); Asahi Kasei E-Materials Corporation, Tokyo (JP)

(72) Inventors: Eiji Honda, Yokohama (JP); Hideki Iijima, Fuji (JP); Yasuhiro Hashimoto, Fuji (JP); Tadashi Ino, Settsu (JP); Tadaharu Isaka, Settsu (JP); Masahiro Kondo, Settsu (JP)

(73) Assignees: Daikin Industries, Ltd., Osaka (JP); Asahi Kasei E-Materials Corporation, Tokyo (JP)

( * ) Notice: Subject to any disclaimer, the term of this patent is extended or adjusted under 35 U.S.C. 154(b) by 0 days.

(21) Appl. No.: 13/655,340

(22) Filed: Oct. 18, 2012

(65) Prior Publication Data

US 2013/0041110 A1 Feb. 14, 2013

Related U.S. Application Data

(62) Division of application No. 13/045,463, filed on Mar. 10, 2011, now abandoned, which is a division of application No. 10/571,317, filed as application No. PCT/JP2004/013241 on Sep. 10, 2004, now abandoned.

(30) Foreign Application Priority Data

| Sep. 10, 2003 | (JP) | ................................. 2003-318243 |
| Aug. 3, 2004 | (JP) | ................................. 2004-226891 |

(51) Int. Cl.

| C08F 8/18 | (2006.01) |
| C08F 8/20 | (2006.01) |
| C08F 28/02 | (2006.01) |
| C08F 14/18 | (2006.01) |

(52) U.S. Cl.
USPC .................. 525/326.4; 525/326.2; 525/328.5; 525/356; 525/357; 525/359.1

(58) Field of Classification Search
USPC ................ 525/326.2, 326.4, 328.5, 356, 357, 525/359.1
See application file for complete search history.

(56) References Cited

U.S. PATENT DOCUMENTS

| 3,085,083 | A | | 4/1963 | Schreyer |
| 3,282,875 | A | * | 11/1966 | Connolly et al. ............. 524/795 |
| 4,599,386 | A | | 7/1986 | Carlson et al. |
| 5,132,368 | A | * | 7/1992 | Chapman et al. ............. 525/165 |
| 5,595,676 | A | | 1/1997 | Barnes et al. |
| 5,674,957 | A | | 10/1997 | DeSimone et al. |
| 6,150,426 | A | | 11/2000 | Curtin et al. |
| 6,685,806 | B1 | | 2/2004 | Cadaval Fernandez De Leceta et al. |
| 7,776,970 | B2 | | 8/2010 | Ino et al. |
| 2001/0018144 | A1 | | 8/2001 | Watakabe et al. |
| 2001/0034465 | A1 | * | 10/2001 | Swain et al. ................... 570/170 |
| 2002/0013419 | A1 | * | 1/2002 | Blong et al. ............... 525/326.4 |
| 2004/0242708 | A1 | | 12/2004 | Hasegawa et al. |

FOREIGN PATENT DOCUMENTS

| CN | 1310190 A | | 8/2001 |
| EP | 0 155 173 A2 | | 9/1985 |
| EP | 1596453 A | | 11/2005 |
| EP | 1635412 A | | 3/2006 |
| GB | 1210794 | * | 1/1969 |
| GB | 1 210 794 | | 10/1970 |
| GB | 1210794 | | 10/1970 |
| JP | 46-23245 | | 7/1971 |
| JP | 53-82684 A | | 7/1978 |
| JP | 54-6887 A | | 1/1979 |
| JP | 2004-18673 A | | 1/2004 |
| JP | 2004-83663 A | | 3/2004 |
| WO | 00/38261 A1 | | 6/2000 |
| WO | 02/077046 A2 | | 10/2002 |
| WO | 02/096983 A1 | | 12/2002 |

\* cited by examiner

Primary Examiner — Robert C Boyle
(74) Attorney, Agent, or Firm — Sughrue Mion, PLLC (57) ABSTRACT

The present invention provides a method for producing a stabilized fluoropolymer which comprises producing the stabilized fluoropolymer by subjecting a treatment target substance containing a sulfonic-acid-derived-group-containing fluoropolymer to a fluorination treatment, wherein the sulfonic-acid-derived-group-containing fluoropolymer is a fluoropolymer containing —$SO_3M$ (in which M represents H, $NR^1R^2R^3R^4$ or $M^1{}_{1/L}$; $R^1$, $R^2$, $R^3$ and $R^4$ are the same or different and each represents H or an alkyl group containing 1 to 4 carbon atoms; and $M^1$ represents an L-valent metal), and the treatment target substance has a moisture content of not higher than 500 ppm by mass.

6 Claims, 2 Drawing Sheets

STABILIZED FLUOROPOLYMER AND METHOD FOR PRODUCING SAME

CROSS REFERENCE TO RELATED APPLICATIONS

This application is a divisional application of U.S. application Ser. No. 13/045,463 filed Mar. 10, 2011, which is a divisional application of U.S. application Ser. No. 10/571,317 filed Mar. 9, 2006, abandoned, which is a 371 of PCT International Application No. PCT/JP2004/013241 filed Sep. 10, 2004, and which claims benefit of Japanese Patent Application No. 2004-226891 filed Aug. 3, 2004 and Japanese Patent Application No. 2003-318243 filed Sep. 10, 2003. The above-noted applications are incorporated herein by reference in their entirety.

TECHNICAL FIELD

The present invention relates to a method for producing a stabilized fluoropolymer, a stabilized fluoropolymer obtained by such production method, and a polymer electrolyte membrane containing a hydrolyzate of such stabilized fluoropolymer.

BACKGROUND ART

Sulfonic-acid-derived-group-containing fluoropolymers obtained by copolymerizing tetrafluoroethylene and a $-SO_2F$-containing perfluorovinyl ether are known to be useful, in the form resulting from hydrolysis of $-SO_2F$, as electrolyte membranes in fuel cells, chemical sensors and so forth.

The hydrolyzates of those sulfonic-acid-derived-group-containing fluoropolymers, when used, for example, as fuel cell electrolyte membranes for a long period of time, reportedly produce, as a result of deterioration thereof, such a problem as contamination of the wastewater discharged from the fuel cells with HF.

Reportedly, an improvement can be produced in this respect by a certain kind of stabilization treatment, namely when such sulfonic-acid-derived-group-containing fluoropolymers in solid state are brought into contact with a fluorine atom radical-generating compound, such as gaseous fluorine, at 20 to 300° C. to thereby convert at least 40% of unstable groups at polymer chain termini to stable groups (cf. e.g. Patent Document 1: Japanese Patent Publication S46-23245).

However, such prior art stabilization treatment has a problem in that in particular when the sulfonic-acid-derived-group-containing fluoropolymer to be treated is one obtained by emulsion polymerization, the rate of conversion of unstable groups to stable groups becomes insufficient and, therefore, discoloration and frothing, among others, occur in the step of melt molding.

DISCLOSURE OF INVENTION

Problems which the Invention is to Solve

In view of the above-discussed state of the art, it is an object of the present invention to provide a method for stabilizing a sulfonic-acid-derived-group-containing fluoropolymer to a satisfactory extent, a stabilized fluoropolymer obtained by such method, and a highly durable fuel cell membrane comprising a hydrolyzate of such stabilized fluoropolymer.

Means for Solving the Problems

The present invention provides a method for producing a stabilized fluoropolymer which comprises producing the stabilized fluoropolymer by subjecting a treatment target substance containing a sulfonic-acid-derived-group-containing fluoropolymer to a fluorination treatment, wherein the sulfonic-acid-derived-group-containing fluoropolymer is a fluoropolymer containing $-SO_3M$ (in which M represents H, $NR^1R^2R^3R^4$ or $M^1_{1/L}$; $R^1$, $R^2$, $R^3$ and $R^4$ are the same or different and each represents H or an alkyl group containing 1 to 4 carbon atoms; and MN represents an L-valent metal), and the treatment target substance has a moisture content of not higher than 500 ppm by mass.

The invention also provides a stabilized fluoropolymer, which is obtained by the method for producing a stabilized fluoropolymer.

The invention further provides a stabilized fluoropolymer obtained via polymerization of an acid-derived group-containing perhalovinyl ether represented by the general formula (II):

$$CF_2=CF-O-(CFY^2)_m-A \qquad (II)$$

(wherein $Y^2$ represents F, Cl, Br or I, m represents an integer of 1 to 5; when m is an integer of 2 to 5, m atoms of $Y^2$ are the same or different; and A represents $-SO_2X$ or $-COZ$; X represents F, Cl, Br, I or $-NR^5R^6$ and Z represents $-NR^7R^8$ or $-OR$; $R^5$, $R^6$, $R^7$ and $R^8$ are the same or different and each represents H, an alkali metal element, an alkyl group or a sulfonyl-containing group and $R^9$ represents an alkyl group containing 1 to 4 carbon atoms), and tetrafluoroethylene, wherein the stabilized fluoropolymer shows an intensity ratio [x/y] between carboxyl group-due peak [x] and $-CF_2-$ due peak [y] of not higher than 0.05 in IR measurement.

The invention further provides a stabilized fluoropolymer obtained via polymerization of an acid-derived group-containing perhalovinyl ether represented by the general formula (II):

$$CF_2=CF-O-(CFY^2)_m-A \qquad (II)$$

(wherein $Y^2$ represents F, Cl, Br or I, m represents an integer of 1 to 5; when m is an integer of 2 to 5, m atoms of $Y^2$ are the same or different; and A represents $-SO_2X$ or $-COZ$; X represents F, Cl, Br, I or $-NR^5R^6$ and Z represents $-NR^7R^8$ or $-OR$; $R^5$, $R^6$, $R^7$ and $R^8$ are the same or different and each represents H, an alkali metal element, an alkyl group or a sulfonyl-containing group and $R^9$ represents an alkyl group containing 1 to 4 carbon atoms) and tetrafluoroethylene, wherein, in a hydrolyzate of the stabilized fluoropolymer, the number [X] of main chain terminal $-CF_3$ groups per $1 \times 10^5$ main chain carbon atoms of the hydrolyzate is not smaller than 10 as calculated using an integrated intensity due to main chain terminal $-CF_3$ groups and an integrated intensity due to $-CF_2-$ adjacent to an ether bond in side chains branched from the main chain in the hydrolyzate, each determined by solid state $^{19}F$ nuclear magnetic resonance spectrometry of the hydrolyzate in a state swollen in an oxygen-containing hydrocarbon compound having a dielectric constant of not lower than 5.0 and further using an ion exchange equivalent weight Ew value determined by titrimetric method.

The invention further provides a polymer electrolyte membrane, which contains a hydrolyzate of the stabilized fluoropolymer.

The invention further provides an active substance-immobilized material which comprises a hydrolyzate of the stabilized fluoropolymer.

The invention further provides a membrane/electrode assembly comprising a polymer electrolyte membrane and an electrode, wherein the membrane/electrode assembly satisfies at least one condition selected from the group consisting of the conditions (1) and (2) given below:

(1) the polymer electrolyte membrane is the polymer electrolyte membrane, and
(2) the electrode is the active substance-immobilized material.

The invention still further provides a solid polymer electrolyte fuel cell which comprises the membrane/electrode assembly.

In the following, the present invention is described in detail.

The method for producing a stabilized fluoropolymer according to the invention comprises producing the stabilized fluoropolymer by subjecting a treatment target substance comprising a sulfonic-acid-derived-group-containing fluoropolymer to a fluorination treatment.

The sulfonic-acid-derived-group-containing fluoropolymer is a fluoropolymer containing —$SO_3M$ (wherein M represents H, $NR^1R^2R^3R^4$ or $M^1{}_{1/L}$).

$R^1$, $R^2$, $R^3$ and $R^4$ in the above-mentioned $NR^1R^2R^3R^4$ are the same or different and each represents H or an alkyl group containing 1 to 4 carbon atoms.

The alkyl group containing 1 to 4 carbon atoms is not particularly restricted but preferably is a straight alkyl group, more preferably a methyl group.

The symbol $M^1$ represents an L-valent metal. The L-valent metal is a metal belonging to the group 1, 2, 4, 8, 11, 12 or 13 of the periodic table.

The L-valent metal is not particularly restricted but includes such metals of the group 1 of the periodic table as Li, Na, K and Cs, such metals of the group 2 of the periodic table as Mg and Ca, such metals of the group 4 of the periodic table as Al etc., such metals of the group 8 of the periodic table as Fe etc., such metals of the group 11 of the periodic table as Cu and Ag, such metals of the group 12 of the periodic table as Zn etc., and such metals of the group 13 of the periodic table as Zr etc.

The sulfonic-acid-derived-group-containing fluoropolymer may further contain, in addition to the above-mentioned group —$SO_3M$, —$SO_2X$ and/or —COZ (wherein X represents F, Cl, Br, I or —$NR^5R^6$ and Z represents —$NR^7R^8$ or —$OR^9$; $R^5$, $R^6$, $R^7$ and $R^8$ are the same or different and each represents H, an alkali metal element, an alkyl group or a sulfonyl-containing group and $R^9$ represents an alkyl group containing 1 to 4 carbon atoms).

X in the above —$SO_2X$ is preferably F, Cl or Br, more preferably F.

The —$OR^9$ is preferred as Z in the above —COZ.

The alkali metal element is not particularly restricted but includes Li, Na, K and Cs, among others.

The alkyl group is not particularly restricted but includes alkyl groups containing 1 to 4 carbon atoms such as methyl and ethyl. The alkyl group may be substituted by a halogen atom or atoms.

The sulfonyl-containing group is a fluorine-containing alkyl group which contains sulfonyl group and may be, for example a fluorine-containing alkylsulfonyl group, which may optionally have a terminal substituent. As the fluorine-containing alkylsulfonyl group, there may be mentioned, for example, —$SO_2R_f^1Z^1$ (in which $R_f^1$ represents a fluorine-containing alkylene group and $Z^1$ represents an organic group) and so forth.

The organic group may be, for example, —$SO_2F$, or may contain such indefinite repetition as —$SO_2(NR^5SO_2R_f^1SO_2)_kNR^5SO_2$— (in which k represents an integer of not smaller than 1 and $R_f^1$ represents a fluorine-containing alkylene group), for example —$SO_2(NR^5SO_2R_f^1SO_2)_kNR^5SO_2F$ (in which k represents an integer of not smaller than 1 but not larger than 100 and $R^5$ and $R_f^1$ are as defined above). For use in fuel cells, the organic group is preferably free of —COZ since the hydrolysis product —COOH may cause a stability problem.

Further, the sulfonic-acid-derived-group-containing fluoropolymer may contain —COOH at its polymer chain terminus or termini.

For example, The above —COOH group(s) is(are) introduced into the main chain terminus(termini) of the sulfonic-acid-derived-group-containing fluoropolymer from the molecular structure of the polymerization initiator.

For example, when a peroxydicarbonate or the like is used as the polymerization initiator, such —COOH groups are formed at the main chain termini of the sulfonic-acid-derived-group-containing fluoropolymer. When produced by emulsion polymerization, the sulfonic-acid-derived-group-containing fluoropolymer generally contains —COOH at its polymer chain terminus or termini.

Further, when a perfluoroalkyldicarboxylic acid is used as the polymerization initiator and the polymerization is carried out in a nonaqueous system, the polymer chain termini partly have the corresponding perfluoroalkyl group but, generally, —COOH and —COF are formed there. This is due to β-scission of the perhalovinyl ether.

The sulfonic-acid-derived-group-containing fluoropolymer is preferably a copolymer which is at least binary comprising an acid-derived group-containing perhalovinyl ether and a copolymerizable monomer with the acid-derived group-containing perhalovinyl ether.

The acid-derived group-containing perhalovinyl ether is preferably a compound represented by the general formula (I):

$$CF_2=CF-O-(CF_2CFY^1-O)_n-(CFY^2)_m-A \qquad (I).$$

In the above general formula (I), $Y^1$ represents F, Cl, Br, I or a perfluoroalkyl group; it is preferably a perfluoroalkyl group, more preferably a perfluoroalkyl group containing 1 to 3 carbon atoms, still more preferably —$CF_3$.

In the above general formula (I), n represents an integer of 0 to 3; the n atoms/groups $Y^1$ are the same or different. The integer n is preferably 0 (zero) or 1, more preferably 0.

In the above general formula (I), $Y^2$ represents F, Cl, Br or I; however, F is preferred among others.

In the above general formula (I), m represents an integer of 1 to 5. When m is an integer of 2 to 5, the m atoms of $Y^2$ are the same or different. The integer m is preferably 2.

The compound of general formula (I) is preferably one in which $Y^2$ is F and m is 2, more preferably one in which $Y^2$ is F, m is 2 and n is 0.

In the above general formula (I), A represents the acid-derived group —$SO_2X$ or —COZ (X and Z being as defined above).

The —$SO_2X$ and/or —COZ, which the sulfonic-acid-derived-group-containing fluoropolymer may optionally have, may also be introduced into the fluoropolymer by polymerization of the acid-derived group-containing perhalovinyl ether represented by the general formula (I).

The acid-derived group-containing perhalovinyl ether is more preferably a compound represented by the general formula (II):

$$CF_2=CF-O-(CFY^2)_m-A \qquad (II)$$

(wherein $Y^2$, m and A are as defined above referring to the general formula (I)).

Either one single species or a combination of two or more species of the acid-derived group-containing perhalovinyl ether may be used.

Preferred as the copolymerizable monomer with the acid-derived group-containing perhalovinyl ether is an "other vinyl ether" other than the above-mentioned acid-derived group-containing perhalovinyl ethers and/or an ethylenic monomer. At least one monomer selected from the group consisting of the "other vinyl ethers other than the acid-derived group-containing perhalovinyl ethers and ethylenic monomers" can be selected as the copolymerizable monomer with the acid-derived group-containing perhalovinyl ether according to the intended purpose.

The ethylenic monomer may be a vinyl group-containing monomer having no ether oxygen atom, and the hydrogen atoms of the vinyl group may be partly or wholly substituted by a fluorine atom or atoms.

As such ethylenic monomer, there may be mentioned, for example, haloethylenic monomers represented by the general formula:

$$CF_2=CF-Rf^2$$

(wherein $Rf^2$ represents F, Cl or a straight or branched fluoroalkyl group containing 1 to 9 carbon atoms), and hydrogen-containing fluoroethylenic monomers represented by the general formula:

$$CHY^3=CFY^4$$

(wherein $Y^3$ represents H or F and $Y^4$ represents H, F, Cl or a straight or branched fluoroalkyl group containing 1 to 9 carbon atoms).

The ethylenic monomer is preferably at least one monomer selected from the group consisting of fluorovinyl ethers represented by $CF_2=CF_2$, $CH_2=CF_2$, $CF_2=CFCl$, $CF_2=CFH$, $CH_2=CFH$ and $CF_2=CFCF_3$. Among them, perhaloethylenic monomers are more preferred, perfluoroethylenic monomers are still more preferred, and tetrafluoroethylene is particularly preferred.

Among such ethylenic monomers, one single species or two or more species can be used.

The "other vinyl ethers" other than the acid-derived group-containing perhalovinyl ethers are not particularly restricted but include those vinyl ethers which contain no acid-derived group, for example perfluorovinyl ethers represented by the general formula:

$$CF_2=CF-O-Rf^3$$

(wherein $Rf^3$ represents a fluoroalkyl group containing 1 to 9 carbon atoms or a fluoropolyether group containing 1 to 9 carbon atoms), and hydrogen-containing vinyl ethers represented by the general formula:

$$CHY^5=CF-O-Rf^4$$

(wherein $Y^5$ represents H or F and $Rf^4$ represents a straight or branched fluoroalkyl group containing 1 to 9 carbon atoms, which may optionally contain an ether oxygen atom or atoms).

Either one single species or a combination of two or more species of the "other vinyl ether" may be used.

Preferred as the sulfonic-acid-derived-group-containing fluoropolymer is a copolymer which is at least binary obtained by copolymerization of at least one of the acid-derived group-containing perhalovinyl ethers and at least one of the ethylenic monomers. A copolymer which is at least binary obtained by copolymerization of one acid-derived group-containing perhalovinyl ether and one ethylenic monomer is more preferred. If desired, however, use may also be made of copolymers obtained by copolymerization of an "other vinyl ether" other than the acid-derived group-containing perhalovinyl ether together with the acid-derived group-containing perhalovinyl ether and ethylenic monomer.

In the practice of the invention, the sulfonic-acid-derived-group-containing fluoropolymer is preferably one comprising 5 to 40 mole percent of an acid-derived group-containing perhalovinyl ether unit derived from the acid-derived group-containing perhalovinyl ether, 60 to 95 mole percent of an ethylenic monomer unit derived from the ethylenic monomer and 0 to 5 mole percent of an "other vinyl ether" unit derived from the "other vinyl ether".

A more preferred lower limit to the acid-derived group-containing perhalovinyl ether unit content is 7 mole percent, a still more preferred lower limit thereto is 10 mole percent, a more preferred upper limit thereto is 35 mole percent, and a still more preferred upper limit is 30 mole percent.

A more preferred lower limit to the ethylenic monomer unit content is 65 mole percent, a still more preferred lower limit thereto is 70 mole percent, a more preferred upper limit thereto is 90 mole percent, and a still more preferred upper limit is 87 mole percent.

A more preferred upper limit to the "other vinyl ether" unit content is 4 mole percent, and a still more preferred upper limit thereto is 3 mole percent.

The term "ethylenic monomer unit" means that moiety which is derived from the molecular structure of the ethylenic monomer and constitutes a part of the molecular structure of the sulfonic-acid-derived-group-containing fluoropolymer. Thus, the tetrafluoroethylene unit means the section $[-CF_2-CF_2-]$ derived from tetrafluoroethylene $[CF_2=CF_2]$.

The term "acid-derived group-containing perhalovinyl ether unit" means that moiety which is derived from the molecular structure of the acid-derived group-containing perhalovinyl ether and constitutes a part of the molecular structure of the sulfonic-acid-derived-group-containing fluoropolymer.

The term "other vinyl ether unit" means that moiety which is derived from the molecular structure of the "other vinyl ether" and constitutes a part of the molecular structure of the sulfonic-acid-derived-group-containing fluoropolymer.

The acid-derived group-containing perhalovinyl ether unit, ethylenic monomer unit and other vinyl ether unit contents so referred to herein are the values respectively calculated with the whole sum of all the monomer units being taken as 100 mole percent.

The term "all the monomer units" means the total amount of all the monomer-derived units constituting the molecular structure of the sulfonic-acid-derived-group-containing fluoropolymer. Therefore, the monomers from which "all the monomers units" are derived constitute the total quantity of all the monomers participating in the formation of the sulfonic-acid-derived-group-containing fluoropolymer.

The "acid-derived group-containing perhalovinyl ether unit" content (in mole percent) so referred to herein is the percentage of the number of moles of the acid-derived group-containing perhalovinyl ether from which the acid-derived group-containing perhalovinyl ether unit is derived to the total number of moles of the monomers from which all the monomer units in the sulfonic-acid-derived-group-containing fluoropolymer are derived. Similarly, the "ethylenic monomer unit" content (in mole percent) and "other vinyl ether unit" content (in mole percent) are respectively the percentages of the number of moles of the corresponding monomers. These respective unit contents are the values obtained by carrying out NMR measurement at 300° C. using a high-temperature $^{19}$F nuclear magnetic resonance spectrometer (model JNM-FX100, product of Nippon Denshi (JEOL), Japan) without using any solvent. Hereinafter, this measurement is referred to as high-temperature NMR for short.

The method of producing the above sulfonic-acid-derived-group-containing fluoropolymer by polymerization may be any of the method known in the art, for example solution polymerization, suspension polymerization and emulsion polymerization. Emulsion polymerization is preferred, however, since this method is most effective in producing stabilized fluoropolymers in accordance with the present invention.

When the sulfonic-acid-derived-group-containing fluoropolymer is produced by emulsion polymerization of a —SO$_2$F-containing monomer, for instance, only a small proportion of this —SO$_2$F group is converted to —SO$_3$H in the process of polymerization. This —SO$_3$H can be readily converted to —SO$_3$NR$^1$R$^2$R$^3$R$^4$ or —SO$_3$M$^1_{1/L}$ in the presence of $^+$NR$^1$R$^2$R$^3$R$^4$ or M$^{1L+}$ (R$^1$, R$^2$, R$^3$, R$^4$ and M$^1$ being as defined above).

The —SO$_2$F-containing monomer is not particularly restricted but may be, for example, an acid-derived group-containing perhalovinyl ether of the general formula (I) in which A is —SO$_2$F. The group —SO$_3$M (M being as defined above) contained in the sulfonic-acid-derived-group-containing fluoropolymer of the invention is not limited, to the one derived from —SO$_2$F contained in the monomer subjected to emulsion polymerization but may be, for example, the one introduced by any of the methods known in the art.

The method for producing stabilized fluoropolymers according to the invention comprises subjecting a treatment target substance containing such a sulfonic-acid-derived-group-containing fluoropolymer as mentioned above to a fluorination treatment.

The "treatment target substance" so referred to herein is the target substance to be subjected to the fluorination treatment.

The treatment target substance may be in the form of a resin powder, pellets, or a molded membrane. From the viewpoint that the fluorination treatment to be described later herein is successful, the treatment target substance is desirably in the form of a resin powder whereas, from the industrial handleability viewpoint, it is desirably in the form of pellets.

The conventional method of fluorination treatment is disadvantageous in that the fluorination of the sulfonic-acid-derived-group-containing fluoropolymer becomes insufficient. The reason for the insufficient fluorination is presumably as follows. Thus, even when the sulfonic-acid-derived-group-containing fluoropolymer is prepared as such a solid form as a powder, pellets or moldings via drying treatment, —SO$_3$M is generally highly hygroscopic and therefore that fluoropolymer absorbs moisture in the air. The group —SO$_3$M is much higher in hygroscopicity than other functional groups such as —COOH, salts thereof, —COZ, —SO$_2$X (Z and X being as defined above). Due to this high hygroscopicity of —SO$_3$M, solids whose substantial main component is the sulfonic-acid-derived-group-containing fluoropolymer generally have a moisture content exceeding 500 ppm by mass depending on the humidity of the atmosphere in which they occur. When a solid, which contains the sulfonic-acid-derived-group-containing fluoropolymer and has such a high moisture content, is subjected to the fluorination treatment in the conventional manner, the fluorine source (F) is consumed by the reaction (A) represented by $$2H_2O + 4(F) \rightarrow 4HF + O_2 \quad (A)$$

and, as a result, the fluorination of the sulfonic-acid-derived-group-containing fluoropolymer is inhibited.

In carrying out the method for producing a stabilized fluoropolymer according to the invention, the treatment target substance has a moisture content of 500 ppm or below. When the moisture content exceeds 500 ppm, the fluorination of the sulfonic-acid-derived-group-containing fluoropolymer is unfavorably inhibited. A preferred upper limit is 450 ppm, and a more preferred upper limit is 350 ppm. Provided that the moisture content in the treatment target substance is within the above range, the lower limit thereto may be set at 0.01 ppm, for instance, from the economy and productivity viewpoint.

The moisture content in the treatment target substance is the value obtained by measurement using the Karl Fischer titration method.

The method for producing a stabilized fluoropolymer according to the invention makes it possible to prevent such an inhibitory reaction in the fluorination treatment as the reaction (A) mentioned above and fluorinate the sulfonic-acid-derived-group-containing fluoropolymer to a sufficient extent by carrying out the fluorination treatment under conditions such that the moisture content of the treatment target substance is within the above range.

The method for reducing the moisture content in the treatment target substance to a level within the above range is not particularly restricted but may be any of the drying methods known in the art, for example the method comprising heating at 80 to 130° C. for 2 to 50 hours, if desirable after dehydration by centrifugation or the like, if desirable while varying the temperature stepwise, if desirable under reduced pressure; or the method comprising melting the treatment target substance in a vented extruder and allowing the water vapor to escape through the vent hole. The use of the latter method may possibly result in partial decomposition of —SO$_3$M, hence is preferred.

Since the sulfonic-acid-derived-group-containing fluoropolymer has highly hygroscopic functional groups, the steps of the above drying and the succeeding fluorination treatment to be described later herein is preferably carried out in a closed system or as quickly as possible.

The fluorination treatment in the method for producing a stabilized fluoropolymer according to the invention is carried out using a fluorine source.

The fluorine source is preferably at least one species selected from the group consisting of F$_2$, SF$_4$, IF$_5$, NF$_3$, PF$_5$, ClF and ClF$_3$, and F$_2$ is more preferred.

Preferably, the fluorination treatment is carried out using a gaseous fluorinating agent comprising such fluorine source as mentioned above. In this case, the fluorine source preferably amounts to not less than 1% by volume in the gaseous fluorinating agent. A more preferred lower limit is 10% by volume.

The gaseous fluorinating agent comprises the above-mentioned fluorine source and a gas inert to fluorination.

The gas inert to fluorination is not particularly restricted but may be, for example, nitrogen gas or argon gas.

The fluorination treatment is preferably carried out at a temperature lower than the melting point of the fluoropolymer, generally at 250° C. or below, more preferably at room temperature to 150° C.

The fluorination treatment can be carried out either continuously or batchwise.

The apparatus to be used in the fluorination treatment is properly selected from among tray type reactors, can type reactors and like stationary reactors; reactors equipped with a stirring impeller; rotary kilns, W cone type reactors, V type blenders and like rotating (reversing) vessel reactors; vibrating reactors; agitated fluidized bed and other various fluidized bed reactors; and so forth.

In the fluorination treatment, a solvent inert to such fluorine source as a fluorocarbon can be used to maintain the reaction temperature uniformity. When the treatment target substance is in the form of a resin powder or pellets, the fluorination treatment is preferably carried out in a rotating vessel reactor or a vibrating reactor since the reaction temperature can be maintained uniformly with ease in such reactor.

The above fluorination treatment is a treatment for converting those unstable groups susceptible to thermal decomposition which the sulfonic-acid-derived-group-containing fluoropolymer before the fluorination treatment has to stable groups hardly susceptible to thermal decomposition.

Presumably, the fluorination treatment preferably converts the —$CF_2SO_3M$ (M being as defined above) which the sulfonic-acid-derived-group-containing fluoropolymer has to —$CF_2H$, —$CF_3$ and/or the like and, further, the —COOH and/or —$SO_2NH_2$ which the sulfonic-acid-derived-group-containing fluoropolymer optionally has at its chain terminus or terminus to —$CF_3$ and/or —$SO_2F$, respectively.

As a result of these conversions resulting from the above fluorination treatment, it becomes possible to avoid the discoloration due to thermal decomposition of such unstable groups as —$SO_3M$ and the foaming due to decomposition of such unstable groups as —COOH in the step of melt molding using the above-mentioned sulfonic-acid-derived-group-containing fluoropolymer.

The fluorination treatment can further eliminate such impurities contained in the treatment target substance as oligomers and other low-molecular-weight substances, unreacted monomers and byproducts.

The —$SO_3M$ groups (M being as defined above) which the sulfonic-acid-derived-group-containing fluoropolymer has are converted to —$CF_2H$, —$CF_3$ or/and the like, which have no ion exchange capacity, by the fluorination treatment. When the —$SO_3M$ groups are the results of conversion of —$SO_2F$, which the above-mentioned monomer has, on the occasion of emulsion polymerization, the conversion of —$SO_2F$ to —$SO_3M$ is very slight and, therefore, the ion exchange equivalent weight [Ew] can be maintained without a marked increase thereof even when the membranes and the like molded from the polymer after the above fluorination treatment are used for the ion exchange purposes.

The method for producing a stabilized fluoropolymer of the invention comprises producing a stabilized fluoropolymer by carrying out the above fluorination treatment.

The "stabilized fluoropolymer" as used herein is a fluoropolymer obtained from a sulfonic-acid-derived-group-containing fluoropolymer by the above-mentioned fluorination treatment and now having such stable groups hardly susceptible to thermal decomposition as —$CF_2H$, —$CF_3$ and —$SO_2F$ in lieu of such unstable groups susceptible to thermal decomposition as —COOH, —$CF_2SO_3M$ and —$SO_2NH_2$ in the original sulfonic-acid-derived-group-containing fluoropolymer.

After the above fluorination treatment, the stabilized fluoropolymer may contain volatile components, for example HF, and it is desirable that such accompanying components be eliminated.

The volatile components are preferably removed using an extruder having a volatile matter eliminating mechanism, more preferably using a vented extruder having at least one vent hole.

As mentioned above, the treatment target substance to be subjected to the fluorination treatment is preferably in the form of a powder and, when a resin powder is used as the treatment target substance, the treatment target substance after the fluorination treatment is preferably subjected to melt-kneading in a vented extruder to eliminate the volatile components and then pelletized. More preferably, the fluorination treatment is carried out in such a vented extruder as mentioned above, followed by volatile matter elimination and pelletization in the same extruder.

Even when the treatment target substance is membranous, the fluorination treatment can stabilize the same in the same manner.

The fluorination treatment of membranous bodies is preferred since the membranous bodies, when they are intended to be used as electrolyte membranes, will not incur any severe thermal damage after stabilization treatment, hence such unstable groups as otherwise resulting from polymer chain cleavage will not be formed.

When the treatment target substance is membranous, the fluorination treatment is preferably carried out, for example, by using pellets molded by the method comprising melting in such a vented extruder as mentioned above for degassing through the vent hole, followed by melt extrusion and using, after membrane molding, a can type reactor or a reaction apparatus equipped with a winder for fluorination treatment.

When drying treatment is carried out prior to the fluorination treatment using any of the various reactors mentioned above, the drying is preferably carried out in the manner of vacuum evacuation or by passing a dry gas through the drier.

When the sulfonic-acid-derived-group-containing fluoropolymer in the treatment target substance contains —COF groups as unstable groups, a relatively high temperature is required for stabilizing those groups. In this case, the fluorination treatment can be carried out after converting such unstable groups to —COOH groups in advance by hydrolysis, for instance, and adjusting the moisture content to a level not higher than 500 ppm.

In accordance with the present invention, the stabilized fluoropolymer is one resulting from conversion of the polymer chain terminal —COOH groups generally occurring before fluorination treatment to such stable groups as —$CF_2H$ and —$CF_3$ groups by the fluorination treatment, as mentioned above. The rate of this conversion is very high in the method for producing a stabilized fluoropolymer according to the invention, and the intensity ratio [x/y] between carboxyl group-due peak [x] and —$CF_2$— due peak [y] can be reduced to not higher than 0.05 in infrared spectroscopy [IR] measurement. A preferred upper limit to the intensity ratio [x/y] is 0.04, and a more preferred upper limit thereto is 0.03.

A stabilized fluoropolymer (hereinafter sometimes referred to as "stabilized fluoropolymer (A)") obtained by the method for producing a stabilized fluoropolymer according to the invention also constitutes an aspect of the present invention.

In the practice of the invention, the stabilized fluoropolymer is preferably one having the characteristic features of the stabilized fluoropolymers (A) and also having the characteristic features of the stabilized fluoropolymers (B) described later herein, one having the characteristic features of the stabilized fluoropolymers (A) and also having the characteristic features of the stabilized fluoropolymers (C) described later herein, or one having the characteristic features of the stabilized fluoropolymers (A) and also having the characteristic features of the stabilized fluoropolymers (B) and further having the characteristic features of the stabilized fluoropolymers (C).

The stabilized fluoropolymer (hereinafter sometimes referred to as "stabilized fluoropolymer (B)") of the invention is a stabilized fluoropolymer obtained via polymerization of an acid-derived group-containing perhalovinyl ether represented by the general formula (II) given hereinabove ($Y^2$, m and A being as defined above) and tetrafluoroethylene, wherein the stabilized fluoropolymer shows an intensity ratio [x/y] between the carboxyl group-due peak [x] and the —$CF_2$— group-due peak [y] of not higher than 0.05 in IR measurement.

The polymerization of the acid-derived group-containing perhalovinyl ether and tetrafluoroethylene is preferably carried out in the manner of emulsion polymerization.

In the above stabilized fluoropolymer (B), the carboxyl groups [—COOH] are formed mainly as polymer chain terminal groups, and the —$CF_2$— groups occur mainly in the polymer main chain.

In the stabilized fluoropolymer (B), a preferred upper limit to the intensity ratio [x/y] is 0.04, and a more preferred upper limit thereto is 0.03.

The method for producing the stabilized fluoropolymers (B) is not particularly restricted provided that they have an intensity ratio [x/y] within the above range. They can be obtained with ease by using the method for producing a stabilized fluoropolymer of the invention.

While it can be obtained with high efficiency by the above-mentioned method for producing a stabilized fluoropolymer of the invention, the stabilized fluoropolymer (B) is not always restricted to one obtained by the method for producing a stabilized fluoropolymer of the invention and, in this respect, conceptually differ from the above-mentioned stabilized fluoropolymers (A).

By saying herein simply "stabilized fluoropolymer" without adding (A), (B) or (C) (to be mentioned later), a superordinate concept is meant that can include the stabilized fluoropolymer (A), stabilized fluoropolymer (B) and/or stabilized fluoropolymer (C) without making any distinction among the stabilized fluoropolymer (A), the stabilized fluoropolymer (B) and the stabilized fluoropolymer (C) described later herein.

The above-mentioned stabilized fluoropolymer shows an intensity ratio [x/y] within the above range in infrared spectroscopy [IR] measurement and, therefore, can be the one hardly causing foaming in the step of melt molding.

In the practice of the invention, the intensity ratio [x/y] is calculated from the respective peak intensities obtained by measurement using an infrared spectrophotometer.

The above-mentioned carboxyl group-due peak intensity [x] is the sum of the associated carboxyl group-due absorption peak intensity observed at around 1776 $cm^{-1}$ and the non-associated carboxyl group-due absorption peak intensity observed at around 1807 $cm^{-1}$.

The above-mentioned —$CF_2$— due peak [y] is the absorption peak due to the overtone of —$CF_2$—.

The above stabilized fluoropolymer preferably has a sulfonyl group content of not higher than 200 ppm. A more preferred upper limit is 50 ppm.

The stabilized fluoropolymer preferably has a carboxyl group content of not higher than 100 ppm. A more preferred upper limit is 30 ppm.

The sulfonyl group content and carboxyl group content reported herein are the values obtained by preparing a 150- to 200-μm-thick membrane for measurement by heat-pressing each stabilized fluoropolymer at 270° C. and 10 MPa for 20 minutes, carrying out spectrum measurement using a FT-IR spectrometer, and following the procedure described below.

First, a standard reference sample is separately prepared by carrying out the fluorination treatment at 150° C. for 20 hours for complete stabilization of unstable groups, and the difference spectrum is derived from an IR spectrum thereof and an IR spectrum of the membrane for measurement with normalization based on the C—F overtone absorption peak, and the intensities of the sulfonic acid group-due absorption peak observable at around 1056 $cm^{-1}$, the associated carboxyl group-due absorption peak observable at around 1776 $cm^{-1}$ and the non-associated carboxyl group-due absorption peak observable at around 1807 $cm^{-1}$ are read from the difference spectrum obtained. For each absorption, the absorption peak intensity Abs is obtained with C—F overtone peak intensity-based normalization.

The content of each functional group is calculated from the extinction coefficient $\in$ ($cm^3$/mol·cm) of the absorption peak of each functional group, the specific gravity d (g/$cm^3$) of the sample and the sample membrane thickness 1 (cm) when the C—F overtone intensity is 1, using the equation:

Functional group content (ppm)={Abs×(molecular weight of each functional group)}×$10^{11}$/∈dl according to Lambert-Beer's law (Abs=∈cl; c being the concentration).

The carboxyl group content so referred to herein is the sum of the associated and non-associated carboxyl group contents.

A stabilized fluoropolymer obtained by polymerization of an acid-derived group-containing perhalovinyl ether represented by the general formula (II) given above and tetrafluoroethylene, wherein, in a hydrolyzate of the stabilized fluoropolymer, the number (X) of main chain terminal —$CF_3$ groups per 1×$10^5$ main chain carbon atoms of the hydrolyzate is not smaller than 10 as calculated using an integrated intensity due to main chain terminal —$CF_3$ groups and an integrated intensity due to —$CF_2$— adjacent to an ether bond in side chains branched from the main chain in the hydrolyzate, each determined by solid state $^{19}F$ nuclear magnetic resonance spectrometry of the hydrolyzate in a state swollen in an oxygen-containing hydrocarbon compound having a dielectric constant of not lower than 5.0 and further using an ion exchange equivalent weight Ew value by titrimetric method (such fluoropolymer is hereinafter sometimes referred to as "stabilized fluoropolymer (C)") also constitutes an aspect of the present invention.

In the above stabilized fluoropolymer (C), in which the number (X) of such main chain terminal —$CF_3$ groups as mentioned above is not smaller than 10, the main chain terminal groups have been stabilized to a sufficient extent.

The lower limit to the number (X) of main chain terminal —$CF_3$ groups is more preferably not lower than 15.

The number (X) of main chain terminal —$CF_3$ groups can be calculated from an integrated intensity of main chain terminal —$CF_3$ groups and an integrated intensity of —$CF_2$— adjacent to an ether bond in side chains branched from the main chain in the hydrolyzate, each determined by solid state $^{19}F$ nuclear magnetic resonance spectrometry and the an exchange equivalent weight Ew value of the sample by titrimetric method.

In the solid state $^{19}F$ nuclear magnetic resonance spectrometry, an oxygen-containing hydrocarbon compound having a dielectric constant of not lower than 5.0 can be used as a swelling solvent. The oxygen-containing hydrocarbon compound having a dielectric constant of not lower than 5.0 is not particularly restricted but there may be mentioned, for example, N-methylacetamide and the like.

In the practice of the invention, the sample fluoropolymer swollen in N-methylacetamide is subjected to solid state $^{19}F$ nuclear magnetic resonance spectrometry using a model DSX400 measuring apparatus (product of Bruker Biospin, Germany) at a number of MAS (Magic Angle Spinning) rotations of 4.8 kHz, a measurement frequency of 376.5 MHz, a chemical shift standard of $CF_3COOH$ (−77 ppm) and a measurement temperature of 473K.

In the above-mentioned solid state $^{19}F$ nuclear magnetic resonance spectrometry, the integrated intensity (A) of main chain terminal —$CF_3$ groups can be measured from the signal showing a peak at −79.7 ppm, and the integrated intensity (B) of —$CF_2$— adjacent to an ether bond in side chains branched from the main chain can be measured from the signal showing a peak at −76.4 ppm.

The number (X) of main chain terminal —$CF_3$ groups can be calculated from the above-mentioned integrated intensity (A) and integrated intensity (B) and the ion exchange equivalent weight Ew determined of the sample by titrimetric method according to the following formula (III):

$$X=100000/[\{(B/A)\times 3/2\}\times\{2\times(Ew-178-50\times m)/100\}+2] \quad (III)$$

wherein m is the value of m in the general formula (II) given hereinabove.

In the above-mentioned IR measurement, the stabilized fluoropolymer (C) preferably shows an intensity ratio [x/y] between carboxyl group-due peak [x] and —$CF_2$— due peak [y] of not higher than 0.05.

The preferred range of the intensity ratio [x/y] in the case of the stabilized fluoropolymer (C) is the same as the range explained hereinabove referring to the stabilized fluoropolymer (B).

The method for producing the stabilized fluoropolymer (C) is not particularly restricted provided that they are produced via polymerization of an acid-derived group-containing perhalovinyl ether represented by the general formula (II) give hereinabove and tetrafluoroethylene. However, the polymerization is preferably carried out in the manner of emulsion polymerization.

The stabilized fluoropolymer (C) can be efficiently obtained by the above-mentioned method for producing a stabilized fluoropolymer according to the invention. The stabilized fluoropolymer (C) is not always limited to one obtained by the method for producing a stabilized fluoropolymer of the invention and, in this respect, are conceptually different from the above-mentioned stabilized fluoropolymer (A).

In the stabilized fluoropolymer (B) and stabilized fluoropolymer (C), the side chains are short, namely the value of n is equal to 0 (zero) in the general formula (I) given hereinabove, as is evident from the general formula (II) given above.

The present inventors found that those polymers whose side chains are short are superior in chemical stability, as is evident from the results of Fenton treatment 1, which are to be mentioned later herein, and have completed the present invention relating to the stabilized fluoropolymer (B) and stabilized fluoropolymer (C).

The stabilized fluoropolymer of the invention preferably has a melt index of 0.1 to 20 g/10 minutes as measured under the conditions of 270° C. and a load of 2.16 kg according to JIS K 7210. The melt index [MI] so referred to herein is also expressed by the term melt mass flow rate [MFR].

In the case of the stabilized fluoropolymer of the invention, a melt index lower than 0.1 (g/10 minutes) tends to make melt molding difficult, while a melt index exceeding 20 (g/10 minutes) may readily cause deterioration in durability when the polymer electrolyte membranes are used in fuel cells.

A more preferred lower limit to the MI is 0.5 (g/10 minutes), and a more preferred upper limit is 10 (g/10 minutes).

The MI so referred to herein is expressed in terms of the weight, in grams, of the test polymer extruded through an orifice having a specific shape and size at 270° C. under a load of 2.16 kg during 10 minutes according to JIS K 7210.

The stabilized fluoropolymer of the invention is more resistant to foaming even in the step of melt molding than the corresponding unstabilized one.

The polymer electrolyte membrane of the invention contains a hydrolyzate of the stabilized fluoropolymer of the invention as mentioned above.

The "hydrolyzate of the stabilized fluoropolymer" is the fluoropolymer obtained by hydrolysis of the stabilized fluoropolymer.

As the hydrolyzate of the stabilized fluoropolymer, there may be mentioned, for example, sulfonic acid type fluoropolymers resulting from conversion of acid-derived —$SO_2F$ groups in the stabilized fluoropolymers of the invention to such salt groups as —$SO_3Na$ or —$SO_3K$ groups by hydrolysis, followed by conversion of these to —$SO_3H$ groups by reaction with an acid, and carboxylic acid type fluoropolymers resulting from conversion of —$COOCH_3$ groups to such salt type groups as —$COONa$ or —$COOK$ groups by hydrolysis, followed by conversion thereof to —$COOH$ groups by reaction with an acid.

The polymer electrolyte membrane of the invention which contains the hydrolyzate of the stabilized fluoropolymer, when used as electrolyte membrane materials in fuel cells, chemical sensors and the like, will not deteriorate during a long period of use, hence the situation that fuel cell wastewater contains HF can be avoided.

The polymer electrolyte membrane of the invention may contain one single hydrolyzate species or two or more such species differing, for example, in m an/or A in the general formula (II) given hereinabove or differing in copolymerization ratio between (II) and TFE as the above-mentioned hydrolyzate of the stabilized fluoropolymer.

In the polymer electrolyte membrane of the invention, the amount of fluoride ion eluted by Fenton treatment comprising immersing b grams of the polymer electrolyte membranes in a liters of an aqueous hydrogen peroxide solution having an initial iron(II) cation concentration of 2 ppm and an initial hydrogen peroxide concentration of 1% by mass at a membrane/bath ratio [b/a] of 3.2 and maintaining the whole at 80° C. for 2 hours is preferably not greater than $11\times10^{-4}$ parts by mass per 100 parts by mass of the polymer electrolyte membrane.

When the polymer electrolyte membrane of the invention shows the amount of fluoride ion within the above range, the degree of stabilization of the stabilized fluoropolymers is sufficiently high.

The amount of fluoride ion eluted by the above Fenton treatment is more preferably not greater than $8.0\times10^{-4}$ parts by mass, still more preferably not greater than $5.0\times10^{-4}$ parts by mass, per 100 parts by mass of the polymer electrolyte membrane. Provided that the amount of fluoride ion eluted by the above Fenton treatment is within the above range, the amount of fluoride ion of not lower than $1.0\times10^{-4}$ parts by mass per 100 parts by mass of the polymer electrolyte membrane are still acceptable from the industrial viewpoint.

The amount of fluoride ion so referred to herein is measured by "Fenton treatment 2" to be described later herein and by ion chromatography (apparatus used: IC-2001, product of Tosoh, Japan; anion analyzing column used: TSKgel Super IC-Anion, product of Tosoh, Japan).

The polymer electrolyte membrane of the invention preferably has a membrane thickness of 5 to 100 μm. When the thickness is less than 5 μm, the membranes, when used in fuel cells, will easily wane in mechanical strength in the process of operation of the fuel cells, leading to breakage thereof. When the thickness exceeds 100 µm, the membranes, when used in fuel cells, show high levels of membrane resistance and cannot manifest sufficient initial characteristics.

The term "initial characteristics" as used herein refers to high numerical values of voltage, power generating capacity in a wide current density range and other performance characteristics as observed in current density-voltage curve measurement during fuel cell operation using the polymer electrolyte membranes of the invention.

A more preferred lower limit to the polymer electrolyte membrane thickness is 10 µm, and a more preferred upper limit thereto is 75 µm.

The polymer electrolyte membranes of the invention can be obtained by carrying out a molding and a hydrolysis.

The molding may comprise (1) molding the stabilized fluoropolymer according to the invention into membranous (film-like) forms or (2) molding a sulfonic-acid-derived-group-containing fluoropolymer not yet subjected to the above-mentioned fluorination treatment into membranous (film-like) forms. In the case of the molding (2) mentioned above, the fluorination treatment can be carried out after molding.

The molding can be carried out, for example, by such melt molding methods as the T-die molding method, inflation molding method and calendering-based molding method.

In the above molding, a third component may be admixed according to need with the stabilized fluoropolymer in the above molding (1) or the sulfonic-acid-derived-group-containing fluoropolymer in the above molding (2).

The molding conditions can be adequately selected depending on the molding method employed. In the case of melt molding using a T die, for instance, the molten resin temperature is preferably 100 to 400° C., more preferably 200 to 300° C.

If it follows the above-mentioned fluorination treatment, the hydrolysis may be carried out either before molding or after molding.

The hydrolysis is carried out by bringing the stabilized fluoropolymer of the invention into contact with a strong base such as an aqueous solution of NaOH or KOH, whereby —$SO_2F$, for instance, is converted, by saponification, to a metal salt such as —$SO_3Na$ or —$SO_3K$, and —$COOCH_3$ to a metal salt such as —COONa or —COOK. After washing with water, the metal salt is further reacted with an acidic solution such as nitric acid, sulfuric acid or hydrochloric acid (whereby —$SO_3Na$, for instance, is converted to —$SO_3H$, and —COONa to —COOH), followed by further washing with water. In this manner, the acid-derived group represented by A in the general formula (I) or general formula (II), in particular —$SO_2X$, can be converted to a sulfonic acid group, whereby the polymer electrolyte membranes can be obtained.

As the method (1) for molding the stabilized fluoropolymer of the invention into membranous (or film-like) form, there may also be mentioned the method (casting method) comprising casting a membrane or film casting liquid onto a supporting member to form a liquid coating film on the supporting member and then removing a liquid medium from the liquid coating film.

The membrane or film casting solution is obtained by the steps of bringing the sulfonic-acid-derived-group-containing fluoropolymer after the above-mentioned fluorination treatment into contact with a strong base such as an aqueous solution of NaOH or KOH for effecting saponification and, after washing with water, further reacting the hydrolyzate with an acidic liquid such as nitric acid, sulfuric acid or hydrochloric acid, followed by further washing with water, for converting side chain terminal acid-derived groups to sulfonic acid groups, and by the step of dispersing or dissolving the polymer thus obtained in an appropriate solvent comprising water, an alcohol and/or an organic solvent, for instance, at 80 to 300° C., if necessary using an autoclave or the like. On the occasion of dispersing or dissolving the polymer, a third component other than the above polymer may be admixed with the polymer according to need.

Usable as the method for casting onto the supporting member are the conventional coating methods using a gravure roll coater, natural roll coater, reverse roll coater, knife coater, dip coater, pipe doctor coater, etc.

The supporting member to be used in casting is not restricted but ordinary polymer films, metal foils, alumina substrates, Si substrates and like substrates can be adequately used. In forming membrane/electrode assemblies (to be described later herein), such supporting members can be removed from the polymer electrolyte membranes, if desired.

By impregnating porous membranes prepared from the polytetrafluoroethylene [PTFE] membrane described in Japanese Patent Publication (Kokoku) H05-75835 with the membrane/film casting liquid and then removing the liquid medium, it is also possible to produce polymer electrolyte membranes containing a reinforcement (the porous membrane). It is also possible to produce fibrillated fiber-reinforced polymer electrolyte membranes, such as those shown in Japanese Kokai Publication S53-149881 and Japanese Patent Publication S63-61337, by adding fibrillated fibers made of PTFE or the like to the membrane/film casting liquid and, after casting, removing the liquid medium.

The polymer electrolyte membrane of the invention may be the one obtained by subjecting to heat treatment (annealing) at 40 to 300° C., preferably 80 to 220°, if desired. Furthermore, they may be subjected to acid treatment with hydrochloric acid or nitric acid, for instance, to sufficiently manifest their intrinsic ion exchange capacity, if desired. Further, they may be oriented in the direction(s) of expanding using a transverse uniaxial tenter or a sequential or simultaneous biaxial tenter.

The hydrolyzate of the above-mentioned stabilized fluoropolymer can be used as membranes and/or electrodes for constituting membrane/electrode assemblies in solid polymer electrolyte fuel cells, which are to be described later herein.

The hydrolyzate of the stabilized fluoropolymer may be one constituting membranes but not constituting electrodes or those not constituting membranes but constituting electrodes or those constituting membranes and electrodes in membrane/electrode assembly constituting the solid polymer electrolyte fuel cell described later herein.

The active substance-immobilized material of the invention comprises a hydrolyzate of the stabilized fluoropolymer as mentioned above and an active substance.

Generally, the active substance-immobilized material is the one obtained by coating a substrate material with a liquid composition prepared by dispersing the hydrolyzate of the stabilized fluoropolymer and the active substance in a liquid medium. When the substrate material is coated with a liquid composition comprising the above-mentioned stabilized fluoropolymer and the active substance, that member can be obtained by hydrolyzing the stabilized fluoropolymer after coating.

The active substance is not particularly restricted provided that it can be active in the active substance-immobilized material. While the active substance is to be properly selected according to the intended purpose of the active substance-immobilized material of the invention, a catalyst may be adequately used in some instances. The active substance-immobilized material of the invention in which a catalyst is used as the active substance can be suitably used as an electrode constituting a membrane/electrode assembly in a fuel cell.

The catalyst is preferably an electrode catalyst, more preferably a platinum-containing metal.

The catalyst is not particularly restricted but may be any of those generally used as electrode catalysts, including, among others, metals containing platinum, ruthenium and/or the like; and organometallic complexes generally containing, as a central metal(s), one or more metals at least one of which is platinum or ruthenium.

The metal containing platinum, ruthenium and/or the like may be a ruthenium-containing metal, for example simple substance ruthenium, but preferably is a platinum-containing metal. The platinum-containing metal is not particularly restricted but may be, for example, simple substance platinum (platinum black); and platinum-ruthenium alloys.

The above catalyst is generally used in a form supported on a carrier such as silica, alumina or carbon.

In cases where the particles or solution of the stabilized fluoropolymer hydrolyzate are or is desired to show good dispersibility, the liquid medium may include, in addition to water, alcohols such as methanol; nitrogen-containing solvents such as N-methylpyrrolidone [NMP]; ketones such as acetone; esters such as ethyl acetate; polar ethers such as diglyme and tetrahydrofuran [THF]; carbonate esters such as diethylene carbonate; and other polar organic solvents. One of these may be used singly or two or more of these may be used in admixture.

The above-mentioned liquid composition comprises at least the stabilized fluoropolymer or the hydrolyzate thereof and the active substance mentioned above and may further contain another or other components according to need.

As the other components for the purpose of membrane molding by casting or impregnation, for instance, there may be mentioned alcohols for improving the leveling properties and polyoxyethylenes for improving the membrane/film-forming properties, among others.

The substrate material is not particularly restricted but includes, among others, porous supports, resin moldings and metal sheets. Preferred are those electrolyte membranes, porous carbon electrodes and like materials used in fuel cells and so forth.

The above-mentioned electrolyte membranes may preferably comprise a fluororesin commonly so referred to and may comprise the hydrolyzate of the stabilized fluoropolymer of the invention. The electrolyte membranes may contain a substance(s) other than the fluororesin generally so referred to and than the hydrolyzate of the stabilized fluoropolymer, so long as the substance(s) will not diminish the properties of the active substance-immobilized materials.

The "coating a substrate material with a liquid composition" consists in applying the above-mentioned liquid composition to the substrate, drying if necessary, further converting the coating to a hydrolyzate if necessary, and, generally, further heating the coating at a temperature not lower than the melting point of the hydrolyzate of the stabilized fluoropolymer.

The conditions of the heating mentioned above are not particularly restricted provided that the hydrolyzate of the stabilized fluoropolymer and active substance can be immobilized on the substrate material. For example, the heating is preferably carried out at 200 to 350° C., for instance, for several minutes, for example 2 to 30 minutes.

When it is to be used in a solid polymer electrolyte fuel cell, the active substance-immobilized material of the invention is preferably an electrode (also referred to as "catalyst layer") comprising the hydrolyzate of the stabilized fluoropolymer, carbon and a catalyst (e.g. Pt).

The membrane/electrode assembly of the invention is a membrane/electrode assembly comprising a polymer electrolyte membrane and an electrode and satisfies at least one condition selected from the group consisting of the following conditions (1) and (2):
(1) the polymer electrolyte membrane is the above-mentioned polymer electrolyte membrane of the invention;
(2) the electrode is the above-mentioned active substance-immobilized material of the invention.

The membrane/electrode assembly of the invention can be used in a solid polymer electrolyte fuel cell, for instance.

When the polymer electrolyte membrane of the invention is used in a solid polymer electrolyte fuel cell, the polymer electrolyte membrane of the invention can be used in a membrane/electrode assembly (hereinafter sometimes referred to as "MEA") in which the membrane is sandwiched between an anode and a cathode and tightly adhered to both. Here, the anode comprises an anode catalyst layer and has protonic conductivity, and the cathode comprises a cathode catalyst layer and has protonic conductivity. The assembly further comprising a gas diffusion layer (to be mentioned later herein) joined to the outside surface of each of the anode catalyst layer and cathode catalyst layer is called "MEA".

The anode catalyst layer contains a catalyst for fuel (e.g. hydrogen) oxidation and ready proton formation, and the cathode catalyst layer contains a catalyst for water formation by reaction of protons and electrons with an oxidizing agent (e.g. oxygen or air). For both the anode and cathode, platinum or an alloy comprising platinum and ruthenium, for instance, is suitably used as the catalyst, preferably in the form of catalyst particles not greater than 10-100 angstroms in diameter. Such catalyst particles are preferably supported on such electrically conductive particles about 0.01 to 10 μm in size as particles of furnace black, channel black, acetylene black, carbon black, active carbon or graphite. The amount of the supported catalyst particles relative to the projected area of the catalyst layer is preferably not smaller than 0.001 mg/cm$^2$ but not greater than 10 mg/cm$^2$.

Further, the anode catalyst layer and cathode catalyst layer preferably contain the hydrolyzate of a fluoropolymer obtained via polymerization of an acid-derived group-containing perhalovinyl ether represented by the general formula (II) given hereinabove and tetrafluoroethylene. The amount of the hydrolyzate of the perfluorocarbonsulfonic acid polymer as supported relative to the projected catalyst layer area is preferably from 0.001 mg/cm$^2$ to not greater than 10 mg/cm$^2$.

As the method for making MEAs, there may be mentioned, for example, the following method. First, the hydrolyzate of the stabilized fluoropolymer is dissolved in a mixed solvent composed of an alcohol and water, and a commercial grade of platinum-supporting carbon (e.g. Tanaka Kikinzoku's TEC10E40E) is dispersed in the solution to give a paste. A predetermined amount of this is applied to one side of each of two PTFE sheets and then dried to form a catalyst layer. Then, the polymer electrolyte membrane of the invention is sandwiched between the PTFE sheets in a manner such that the respective coated surfaces face each other, and the whole is subjected to heat pressing at 100 to 200° C. for transfer joining or coating. Upon removal of the PTFE sheets, a MEA can be obtained. Such and other methods for manufacturing MEAs are well known to those skilled in the art. The methods for manufacturing MEAs are described in detail in Journal of Applied Electrochemistry, 22 (1992), pages 1 to 7, for instance.

Usable as the gas diffusion layer are commercial grades of carbon cloth or carbon paper. A typical example of the former is the carbon cloth E-tek, B-1, which is a product of De Nora North America, U.S.A. As typical examples of the latter, there may be mentioned Carbel (registered trademark, Japan Gore-Tex, Japan), TGP-H, which is a product of Toray, Japan, and the carbon paper 2050, which is a product of Spectracorp, U.S.A., among others.

The structural unit resulting from integration of an electrode catalyst layer with a gas diffusion layer is called "gas diffusion electrode". A MEA can also be obtained by joining such gas diffusion electrodes to the polymer electrolyte membrane of the invention. As a typical example of the commercially available gas diffusion electrode, there may be mentioned the gas diffusion electrode ELAT (registered trademark; product of De Nora North America, U.S.A.; carbon cloth being used as the gas diffusion layer).

The solid polymer electrolyte fuel cell of the invention contains the above-mentioned membrane/electrode assembly.

The solid polymer electrolyte fuel cell is not particularly restricted provided that it contains the above-mentioned membrane/electrode assembly. Generally, it may contain electrodes, a gas and other constituent elements constituting a solid polymer electrolyte fuel cell.

The stabilized fluoropolymer and the hydrolyzate thereof according to the invention are excellent in chemical stability, as described hereinabove, and, therefore, can be suitably used over a long period of time as the electrolyte membrane in a fuel cell, such as a solid polymer electrolyte fuel cell, which is generally used under severe conditions, and as a material thereof.

The membrane obtained by cast film formation, the membrane formed on a porous supporting member, the active substance-immobilized material, the polymer electrolyte membrane and the solid polymer electrolyte fuel cell, each mentioned hereinabove, are obtained by using the hydrolyzate of the stabilized fluoropolymer. The liquid composition mentioned above is preferably the one comprising the hydrolyzate of the stabilized fluoropolymer.

The polymer electrolyte membranes of the invention are useful not only as the membrane materials of the solid polymer electrolyte fuel cells but also as membrane materials for manufacturing electrolyte membranes for use in lithium cell membranes, membranes for use in electric soda processes, membranes for use in electrolysis of water, membranes for use in hydrofluoric acid electrolysis, membranes for oxygen concentration apparatus, humidity sensor membranes, gas sensor membranes and separation membranes, or ion exchange membranes.

Effects of the Invention

The method for producing a stabilized fluoropolymer of the invention makes it possible to fluorinate unstable groups of a sulfonic-acid-derived-group-containing fluoropolymer to a satisfactory extent.

The stabilized fluoropolymer of the invention is excellent in chemical stability, as mentioned above, and, therefore, the hydrolyzate thereof can be suitably used as electrolyte membranes or like membrane materials or electrodes for use in fuel cells, such as solid polymer electrolyte fuel cells, which are used under very severe conditions and make it possible to obtain highly durable fuel cell membranes or electrodes causing very low levels of the fluoride ion concentration in wastewater.

BEST MODES FOR CARRYING OUT THE INVENTION

The following examples illustrate the present invention in further detail. These examples are, however, by no means limitative of the scope of the invention.

Measurement Methods

1. Moisture Content Measurement

Using a moisture evaporator (trademark: ADP-351, product of Kyoto Electronics Manufacturing Co.), the sample was heated, with dry nitrogen as a carrier gas, and the moisture evaporated was collected in a Karl Fischer moisture titrator and determined by coulometric titration.

The sample size was 1 g, and the measurement temperature was 150° C.

2. Functional Group Determination by IR

The polymer sample was heat-pressed at 270° C. and 10 MPa for 20 minutes to give a 150- to 200-µm-thick membrane, which was subjected to spectrometry using a FT-IR spectrograph.

3. Stability Testing with Fenton's Reagent (1) Fenton Treatment 1

The polymer sample was heat-pressed at 270° C. and 10 MPa for 20 minutes, and the polymer side chain terminal groups were then converted to sulfonic acid groups to give a membrane for stability testing.

A solution of 1 mg of $FeSO_4 \cdot 7H_2O$ in 20 ml of a 30% (by mass) aqueous solution of hydrogen peroxide was placed in a tetrafluoroethylene/perfluoro(alkyl vinyl ether) copolymer-made bottle, 3 g of the membrane for stability testing was immersed therein and maintained at 85° C. for 20 hours. Thereafter, the whole was cooled to room temperature, the membrane for stability testing was taken out, and the fluoride ion concentration in the liquid phase was determined using a fluoride ion meter (Orion EA940 expandable ion analyzer).

(2) Fenton Treatment 2

The polymer electrolyte membrane (b grams) was immersed in an aqueous hydrogen peroxide solution (a liters) with an initial iron(II) cation concentration of 2 ppm and an initial hydrogen peroxide concentration of 1% by mass at a membrane/liquid ratio [b/a] of 3.2 and, after 2 hours of maintenance at 80° C., the sample polymer (polymer electrolyte membrane) was removed. The liquid amount was measured and then appropriately diluted with distilled water for ion chromatography, and the amount of fluoride ion $F^-$ was determined by ion chromatography. The measurement apparatus used was IC-2001, product of Tosoh, Japan, and the anion analyzing column used was TSKgel Super IC-Anion, product of Tosoh, Japan. The amount of fluoride ion eluted was expressed in terms of the mass of fluoride ion eluted per 100 parts by mass of the sample polymer mass.

4. Ion Exchange Equivalent Weight Ew Measurement

A 0.1-g section cut out of the sample polymer electrolyte membrane was immersed in 30 ml of a saturated aqueous solution of NaCl at a temperature of 25° C. and, after 30 minutes of standing with stirring, the system was subjected to neutralization titration with a 0.01 N aqueous solution of sodium hydroxide, with phenolphthalein as an indicator. The point at which the pH meter used (TPX-90, product of Toko Kagaku Kenkyusho, Japan) indicated a value within the range of 6.95-7.05 was taken as the equivalence point. After neutralization, the Na salt form electrolyte membrane was rinsed with pure water, then dried under vacuum and weighed. The ion exchange equivalent weight Ew (g/eq) was calculated from the equivalent amount M (mmol) of sodium hydroxide required for neutralization and the weight W (mg) of the Na salt form electrolyte membrane according to the following equation:

$$Ew = (W/M) - 22$$

5. Solid State $^{19}$F Nuclear Magnetic Resonance Spectrometry

The solid state $^{19}$F nuclear magnetic resonance spectrometry was carried out under the following conditions. The sample was subjected to NMR measurement while being immersed in a swelling solvent in a test tube for NMR spectrometry.

Figure 1:
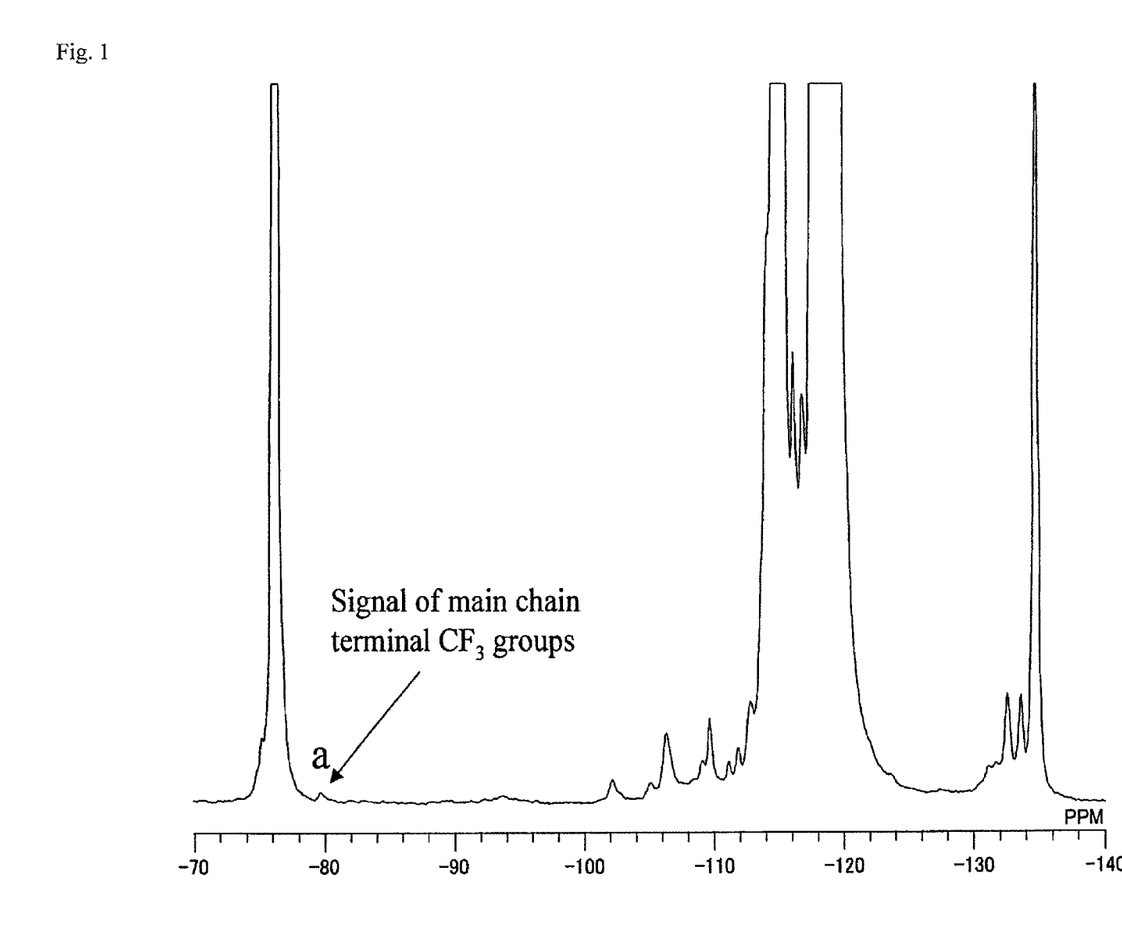
FIG. 1 is a NMR chart obtained by subjecting the stabilized fluoropolymer G obtained in Example 5 to solid state $^{19}$F nuclear magnetic resonance spectrometry (the ordinate being magnified 13 times as compared with FIG. 2).
Figure 2:
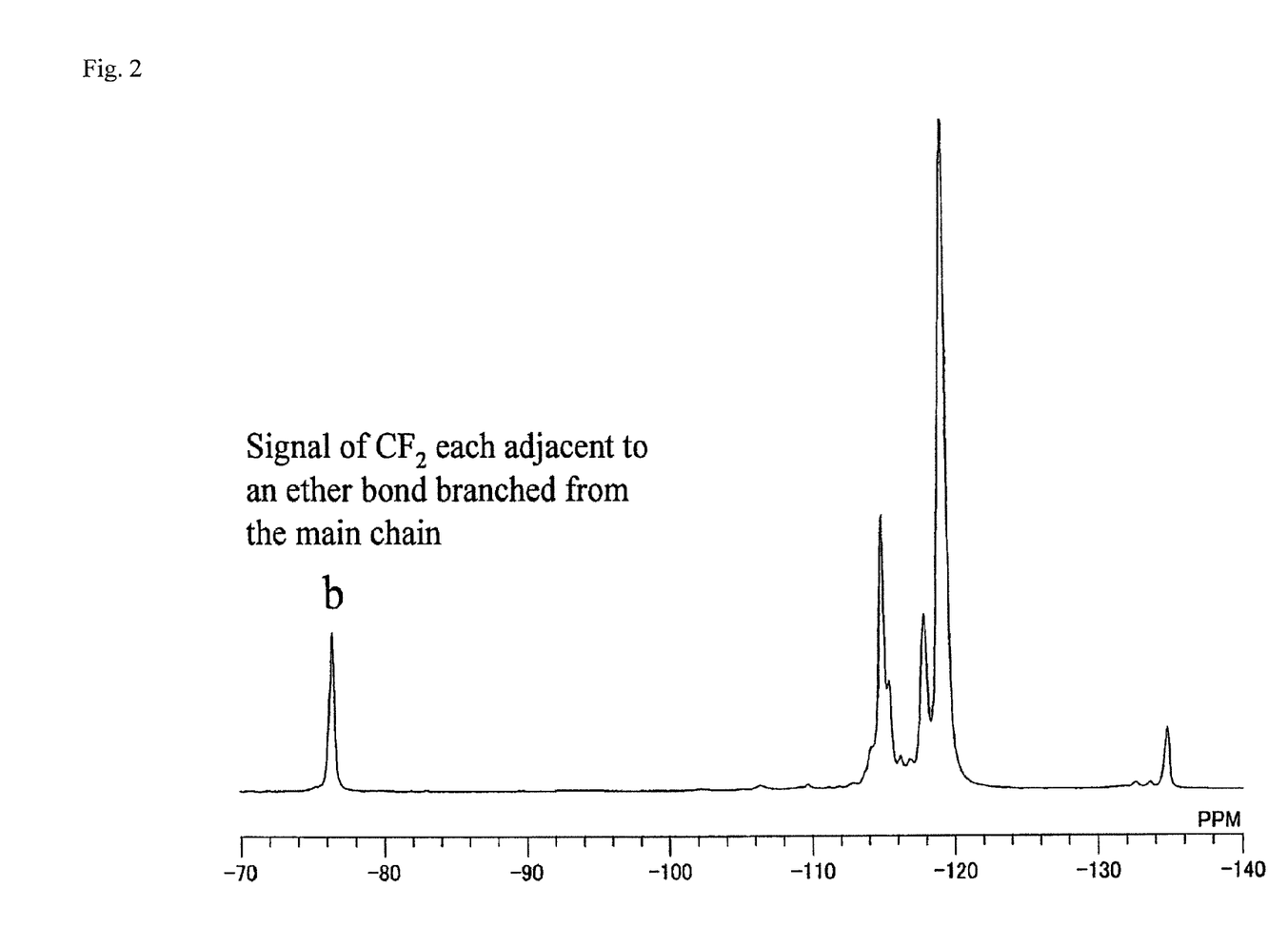
FIG. 2 is a NMR chart obtained by subjecting the stabilized fluoropolymer G obtained in Example 5 to solid state $^{19}$F nuclear magnetic resonance spectrometry.

Apparatus: DSX400, product of Bruker Biospin, Germany
Number of MAS rotations: 4.8 kHz
Observation frequency: 376.5 MHz
Chemical shift standard: $CF_3COOH$ (−77 ppm)
Swelling solvent: N-Methylacetamide
Measurement temperature: 473K The method of calculation is described below. The main chain terminal —$CF_3$ group (in FIG. 1, a) is detected at −79.7 ppm. The integrated intensity of this signal is expressed as A. On the other hand, a signal of the —$CF_2$— group adjacent to a side chain ether (in FIG. 2, b) is observed at −76.4 ppm. The integrated intensity of this signal is expressed as B. The number (X) of main chain terminal $CF_3$ groups per $10^5$ main chain-constituting carbon atoms can be calculated from the values of A and B and the Ew of the sample as determined by the ion exchange equivalent weight (Ew) measurement method described above under 4., using the following equation (III):

$$X = 100000 / [\{(B/A) \times 3/2\} \times \{2 \times (Ew - 178 - 50 \times m)/100\} + 2] \quad (III)$$

wherein m is the value of m defined hereinabove referring to the general formula (II).

6. Fuel Cell Evaluation

The polymer electrolyte membrane was evaluated in a fuel cell in the following manner. First, electrode catalyst layers were produced. Thus, a 5% (by mass) fluoropolymer solution in a solvent composition composed of ethanol and water at a ratio of 50/50 (by mass) was prepared and further concentrated to 11% by mass. A 3.31-g portion of the polymer solution was added to 1.00 g of Pt-carrying carbon (TEC10E40E, Pt content 36.4% by weight, product of Tanaka Kikinzoku, Japan). Further addition of 3.24 g of ethanol and thorough mixing up using a homogenizer gave an electrode ink. This electrode ink was applied onto PTFE sheets by screen printing. Two coating weight levels were employed. In one case, the amount of the Pt supported and that of the polymer supported were both 0.15 mg/cm$^2$ and, in the other, the amount of the Pt supported and that of the polymer supported were both 0.30 mg/cm$^2$. After application, the coat layers were dried at room temperature for 1 hour and then in air at 120° C. for 1 hour to give about 10-μm-thick electrode catalyst layers. Among these electrode catalyst layers, the one carrying 0.15 mg/cm$^2$ of Pt and of the polymer was used as the anode catalyst layer, and the one carrying 0.30 mg/cm$^2$ of Pt and of the polymer was used as the cathode catalyst layer.

The polymer electrolyte membrane was sandwiched between thus-obtained anode catalyst layer and cathode catalyst layer with the layers facing each other, and the whole was hot pressed at 160° C. and a contact area pressure, of 0.1 MPa, whereby the anode catalyst layer and cathode catalyst layer were transferred and joined to the polymer electrolyte membrane to give a MEA.

Carbon cloths (ELAT (registered trademark) B-1, product of De Nora North America, U.S.A.) were set, as gas diffusion layers, on both sides of this MEA (on the outside surfaces of the anode catalyst layer and cathode catalyst layer), and the whole was integrated into a cell for evaluation. This cell for evaluation was set on a cell evaluation apparatus (Toyo Tekunika (Toyo Corp.) model 890CL fuel cell evaluation system) and, after raising the temperature to 80° C., hydrogen gas was caused to flow on the anode side at a rate of 150 cc/min, and air gas was caused to flow on the cathode side at a rate of 400 cc/min. For gas humidification, the water bubbling method was used, and hydrogen gas and air gas were humidified at 80° C. and 50° C., respectively. While feeding the humidified hydrogen gas and air gas to the cell, the current density-voltage curve was measured for initial characteristics evaluation.

After the above initial characteristics evaluation, durability testing was carried out at a cell temperature of 100° C. In each case, the gas humidifying temperature was 60° C. for both the anode and cathode. When the cell temperature was 100° C., hydrogen gas was fed to the anode side at 74 cc/min and air gas to the cathode side at 102 cc/min and, while pressurizing the anode side at 0.30 MPa (absolute pressure) and the cathode side at 0.15 MPa (absolute pressure), electricity was generated at a current density of 0.3 A/cm$^2$. If the polymers in the membrane and/or electrodes are deteriorated on such occasion, the fluoride ion concentrations in exhaust water on the anode side and cathode side will increase. Therefore, the fluoride ion concentrations in exhaust water were measured at timed intervals using a model 9609B Nionplus fluoride ion selective multiple electrode of a model 920Aplus benchtop pH/ion meter (product of Meditorial, Japan). If a pinhole is formed in the polymer electrolyte membrane during such durability test, the so-called crossleak phenomenon, namely leakage of a large amount of hydrogen gas to the cathode side. For examining the degree of this crossleak, the hydrogen concentration in the exhaust gas on the cathode side was measured using a micro GC (CP4900, product of Varian, Netherlands) and, at the time when this measured value arrived at a level 10 times the initial level, the test was finished.

7. Melt Index [MI] Measurement

The melt index of each fluoropolymer was measured according to JIS K 7210 under the conditions of 270° C. and a load of 2.16 kg using a type C-5059D melt indexer, product of Toyo Seiki Seisakusho, Japan. The weight of the polymer extruded was expressed in terms of grams per 10 minutes.

Example 1

(1) Polymer Synthesis

A 3000-ml stainless steel stirring autoclave was charged with 300 g of a 10% aqueous solution of $C_7F_{15}COONH_4$ and 1170 g of pure water, followed by thorough evacuation and nitrogen substitution. After sufficiently evacuating the autoclave, tetrafluoroethylene [TFE] gas was fed to the autoclave until a gage pressure of 0.2 MPa, and the temperature was raised to 50° C. Then, 100 g of $CF_2\!\!=\!\!CFOCF_2CF_2SO_2F$ was injected into the autoclave, and the gage pressure was raised to 0.7 MPa by introduction of TFE gas. Thereafter, an aqueous solution of 0.5 g of ammonium persulfate [APS] in 60 g of pure water was injected to start the polymerization. For supplementing the TFE consumed by polymerization, TFE was continuously fed to the autoclave so that the autoclave inside pressure might be maintained at 0.7 MPa. The polymerization was continued while continuously feeding $CF_2\!\!=\!\!CFOCF_2CF_2SO_2F$ in an amount of 53% by mass relative to the TFE further fed.

After completion of feeding of 522 g of TFE, the autoclave inside pressure was released and the polymerization was thereby terminated. After cooling to room temperature, there was obtained 2450 g of a somewhat cloudy aqueous dispersion containing about 33% by mass of an $SO_2F$-containing perfluoropolymer.

The aqueous dispersion was coagulated with nitric acid, and the solid was washed with water and dried at 90° C. for 24 hours and further dried at 120° C. for 12 hours to give 800 g of a fluoropolymer (A).

Then, 1 g of the thus-obtained fluoropolymer A was immediately put into a tubular oven heated at 150° C. for evaporating the moisture, which was introduced into a Karl Fischer moisture measuring apparatus using dry nitrogen as a carrier gas. The moisture content thus determined was 200 ppm by mass.

Further, a high-temperature NMR measurement at 300° C. revealed that the $CF_2=CFOCF_2CF_2SO_2F$ unit content in the fluoropolymer A was 19 mole percent.

The above fluoropolymer A was heat-pressed at 270° C. and 10 MPa for 20 minutes to give a 170-μm-thick transparent membrane.

Upon IR measurement, any sulfonic acid-due peak was not observed. The intensity ratio [x/y] between the carboxyl group-due peak [x] and the $—CF_2—$ group-due peak [y] was 0.23.

(2) Fluorination

A 200-g portion of the above fluoropolymer A with a moisture content of 200 ppm was placed in a 1000-ml autoclave (made of Hastelloy), and the temperature was raised to 120° C. under evacuation. The procedure comprising evacuation and nitrogen substitution was repeated three times and, thereafter, nitrogen was introduced to a gage pressure of 0 MPa. Then, a gaseous fluorinating agent prepared by diluting fluorine gas to 20% by volume with nitrogen gas was introduced into the autoclave until arrival of the gage pressure at 0.1 MPa, and the resulting system was maintained for 30 minutes.

Then, the fluorine in the autoclave was discharged and, after evacuation, a gaseous fluorinating agent prepared by diluting fluorine gas to 20% by volume with nitrogen gas was introduced until arrival of the gage pressure at 0.1 MPa and the system was maintained for 3 hours.

Thereafter, the autoclave was cooled to room temperature, the fluorine was discharged therefrom and, after three repetitions of evacuation and nitrogen substitution, the autoclave was opened. A stabilized fluoropolymer (B) was thus obtained.

The above stabilized fluoropolymer B was heat-pressed at 270° C. and 10 MPa for 20 minutes to give a 170-μm-thick transparent membrane.

Upon IR measurement, any sulfonic acid-due peak was not observed. The intensity ratio [x/y] between the carboxyl group-due peak [x] and the $—CF_2—$ group-due peak [y] was 0.03.

The stabilized fluoropolymer obtained was extruded through a melt indexer [MI meter] at 270° C. under a load of 5 kg to give an, extrudate strand. The strand obtained was again extruded through the MI meter. After two repetitions of this procedure, the strand obtained showed almost no discoloration.

Comparative Example 1

The fluoropolymer A obtained in Example 1 was allowed to stand in the air for 2 days and the moisture content was then measured and found to be 700 ppm.

This polymer was fluorinated in the same manner as in Example 1 to give a fluoropolymer (C). The upper part of the autoclave used for producing the fluoropolymer C was found to have been colored green, indicating the progress of corrosion.

The fluoropolymer C was heat-pressed at 270° C. and 10 MPa for 20 minutes to give a 160-μm-thick transparent membrane.

As a result of IR measurement, the intensity ratio [z/y] between the sulfonic acid-due peak [z] and the $—CF_2—$ group-due peak [y] was found to be 0.03. The intensity ratio [x/y] between the carboxyl group-due peak [x] and the $—CF_2—$ group-due peak [y] was 0.14.

The fluoropolymer C obtained was extruded through a MI meter at 27000 under a load of 5 kg to give an extrudate strand. The strand obtained was again extruded through the MI meter. After two repetitions of this procedure, the strand obtained was found colored dark brown.

In view of the above results, the fluorination of the fluoropolymer A having a moisture content lower than 500 ppm as carried out in Example 1 could stabilize terminals as compared with Comparative Example 1 in which the moisture content was 700 ppm. It was also found that the fluoropolymer in Example 1 was inhibited from being discolored.

Example 2

The membrane obtained in Example 1 (2) was treated in a 20% aqueous solution of sodium hydroxide at 90° C. for 24 hours and then washed with water. It was then treated in 6 N sulfuric acid at 60° C. for 24 hours and then washed with water until the washings showed neutrality, to give a sulfonic acid form membrane.

This membrane was thoroughly dried at 11000, and 3 g of the dried membrane was taken and subjected to stability testing by Fenton treatment 1. The fluoride ion concentration was 5 ppm.

Comparative Example 2

A polymer membrane (trade mark: Nafion 117, product of DuPont) produced by polymerization of $CF_2=CFOCF_2CF(CF_3)OCF_2CF_2SO_2F$ was used as a sulfonic-acid-derived-group-containing fluoropolymer and subjected to stability testing by Fenton treatment 1 in the same manner as in Example 2. The fluoride ion concentration was 20 ppm.

The results of the above stability testing indicated that the polymer obtained by copolymerization of $CF_2=CFOCF_2CF_2SO_2F$ and TFE and the subsequent terminal stabilization of the copolymer is superior in stability to the polymer produced by using $CF_2=CFOCF_2CF(CF_3)OCF_2CF_2SO_2F$.

Example 3

(1) Polymer Synthesis

A 3000-ml stainless steel stirring autoclave was thoroughly evacuated, followed by nitrogen substitution. The autoclave was again thoroughly evacuated and, then, charged with 1530 g of perfluorohexane and 990 g of $CF_2=CFOCF_2CF_2SO_2F$, and the temperature was adjusted to 25° C. Then, tetrafluoroethylene [TFE] gas was introduced until arrival of the gage pressure at 0.30 MPa, followed by introduction under pressure of 13.14 g of a 10% (by mass) solution of the polymerization initiator $(C_3F_7COO)_2$ in perfluorohexane to initiate the polymerization reaction. For supplementing the TFE consumed by polymerization, TFE was continuously fed to the autoclave so that the autoclave inside pressure might be maintained at 0.30 MPa. The polymerization was continued while further feeding a total of 47 g of $CF_2=CFOCF_2CF_2SO_2F$ intermittently.

After completion of feeding of 73 g of TFE, the autoclave inside pressure was released and the polymerization was thereby terminated.

After completion of the polymerization reaction, 1500 ml of chloroform was added, and the resulting mixture was stirred for 10 minutes. The mixture was then subjected to solid-liquid separation using a centrifuge, 1500 ml of chloroform was added to the solid matter, and the mixture was stirred, for 10 minutes. This procedure was repeated three times to wash the polymer. This washed polymer was then deprived of the residual chloroform at 120° C. under vacuum to give 128 g of a fluoropolymer (D).

Then, 1 g of the thus-obtained fluoropolymer D was immediately put into a tubular oven heated at 150° C. for evaporating the moisture, which was introduced into a Karl Fischer moisture measuring apparatus using dry nitrogen as a carrier gas. The moisture content thus determined was 50 ppm by mass.

Further, a high-temperature NMR measurement at 300° C. revealed that the $CF_2=CFOCF_2CF_2SO_2F$ unit content in the fluoropolymer D was 18 mole percent.

The above fluoropolymer D was heat-pressed at 270° C. and 10 MPa for 20 minutes to give a 160-μm-thick transparent membrane.

Upon IR measurement, any sulfonic acid-due peak was not observed. The intensity ratio [x/y] between the carboxyl group-due peak [x] and the —$CF_2$— group-due peak [y] was 0.08.

(2) Fluorination

A 100-g portion of the fluoropolymer D was treated in the same manner as in Example 1 to give a stabilized fluoropolymer (E).

A thin membrane was prepared by heat pressing in the same manner as in Example 1 and subjected to IR measurement. Neither sulfonic acid-due peak nor carboxyl group-due peak was observed.

Example 4

The thin membrane of the stabilized fluoropolymer E was treated in the same manner as in Example 2 to give a sulfonic acid form membrane.

This membrane was thoroughly dried at 110° C., and 3 g of the dried membrane was taken and subjected to the above-mentioned Fenton treatment 1. The fluoride ion concentration was 5 ppm.

Example 5

(1) Polymer Synthesis

A 6-liter stainless steel stirring autoclave was charged with 150 g of a 10% aqueous solution of $C_7F_{15}COONH_4$ and 2840 g of pure water, followed by thorough evacuation and nitrogen substitution. After sufficiently evacuating the autoclave, tetrafluoroethylene [TFE] gas was fed to the autoclave until a gage pressure of 0.2 MPa, and the temperature was raised to 50° C. Then, 180 g of $CF_2=CFOCF_2CF_2SO_2F$ was injected into the autoclave, and the gage pressure was raised to 0.7 MPa by introduction of TFE gas. Thereafter, an aqueous solution of 1.5 g of ammonium persulfate [APS] in 20 g of pure water was injected to start the polymerization.

For supplementing the TFE consumed by polymerization, TFE was continuously fed to the autoclave so that the autoclave inside pressure might be maintained at 0.7 MPa. The polymerization was continued while continuously feeding $CF_2=CFOCF_2CF_2SO_2F$ in an amount of 70% by mass relative to the TFE further fed.

After completion of feeding of 920 g of TFE, the autoclave inside pressure was released and the polymerization was thereby terminated. After cooling to room temperature, there was obtained 4650 g of a somewhat cloudy aqueous dispersion containing about 32% by mass of a $SO_2F$-containing perfluoropolymer.

The aqueous dispersion was coagulated with nitric acid, and the solid was washed with water and dried at 90° C. for 24 hours and further dried at 120° C. for 12 hours to give 1500 g of a fluoropolymer (F).

Then, 1 g of the thus-obtained fluoropolymer F was immediately put into a tubular oven heated at 150° C. for evaporating the moisture, which was introduced into a Karl Fischer moisture measuring apparatus using dry nitrogen as a carrier gas. The moisture content thus determined was 150 ppm by mass.

Further, a high-temperature NMR measurement at 300° C. revealed that the $CF_2=CFOCF_2CF_2SO_2F$ unit content in the fluoropolymer F was 18.6 mole percent.

The above fluoropolymer F was heat-pressed at 270° C. and 10 MPa for 20 minutes to give a 170-μm-thick transparent membrane. As a result of IR measurement, the intensity ratio [z/y] between the sulfonic acid-due peak [z] and the —$CF_2$— group-due peak [y] was found to be 0.05. The intensity ratio [x/y] between the carboxyl group-due peak [x] and the —$CF_2$— group-due peak [y] was 0.20.

(2) Fluorination

A 700-g portion of the above fluoropolymer F was then placed in a 3-liter autoclave made of Hastelloy, and the temperature was raised to 120° C. under evacuation. The procedure comprising evacuation and nitrogen substitution was repeated three times and, thereafter, nitrogen was introduced to a gage pressure of −0.5 MPa. Then, a gaseous fluorinating agent prepared by diluting fluorine gas to 20% by volume with nitrogen gas was introduced into the autoclave until arrival of the gage pressure at 0 MPa, and the resulting system was maintained for 30 minutes.

Then, the fluorine in the autoclave was discharged and, after evacuation, a gaseous fluorinating agent prepared by diluting fluorine gas to 20% by volume with nitrogen gas was introduced until arrival of the gage pressure at 0 MPa and the system was maintained for 3 hours.

Thereafter, the autoclave was cooled to room temperature, the fluorine was discharged therefrom and, after three repetitions of evacuation and nitrogen substitution, the autoclave was opened. A stabilized fluoropolymer (G) was thus obtained.

The above stabilized fluoropolymer G was heat-pressed at 270° C. and 10 MPa for 20 minutes to give a 170-μm-thick transparent membrane.

Upon IR measurement, neither sulfonic acid-due peak nor carboxyl group-due peak was observed.

The MI of this stabilized polymer G was 3.5 (g/10 min). The stabilized fluoropolymer G was molded into a 50-μm-thick thin membrane by extrusion melt molding at 280° C. using a T die. This thin membrane was treated in the same manner as in Example 2 to give a sulfonic acid form membrane. The Ew of this sulfonic acid form membrane was determined by the ion exchange equivalent weight (Ew) measurement method described hereinabove and found to be 720 (g/eq). Measurements made according to the above-mentioned solid sate $^{19}$F nuclear magnetic resonance measurement method gave the following results: B/A=302.1, X=20.4 (m=2 in the general formula (II)).

Further, this sulfonic acid form membrane was subjected to the above-mentioned Fenton treatment 2. Fluoride ion was found to amount to $3.1 \times 10^{-4}$ parts by mass per 100 parts by mass of the membrane.

Then, using this electrolyte membrane, a membrane/electrode assembly (MEA) was produced according to the method described hereinabove. The fluoropolymer used on that occasion in producing the electrodes was the same polymer as used in the electrolyte membrane, namely the sulfonic acid form polymer obtained by conversion treatment of the stabilized fluoropolymer G.

This MEA was integrated into the cell for evaluation, and the initial characteristics were measured at a cell temperature of 80° C. by the method described hereinabove. The relationship between the voltage (V) and current density (A/cm$^2$) indicated very good cell performance characteristics: 0.77 V at 0.5 A/cm$^2$, 0.68 V at 1.0 A/cm$^2$ and 0.55 V at 1.5 A/cm$^2$.

In the durability test at 100° C., the cell could be operated for 550 hours and thus a high level of durability could be attained. The fluoride ion concentration in the wastewater after the lapse of 50 hours was 0.16 ppm on the cathode side and, on the anode side, it was 0.23 ppm. After 400 hours, the fluoride ion concentration in the wastewater was 0.22 ppm on the cathode side and, on the anode side, it was 0.48 ppm.

Comparative Example 3

A polymer prepared in quite the same manner as in the case of the fluoropolymer F except that it was not subjected to fluorination treatment was made into a 50-m-thick thin membrane by extrusion melt molding at 280° C. using a T die in the same manner as in Example 5. The MI of this fluoropolymer F was 3.5 (g/10 min) This thin membrane was treated in the same manner as in Example 2 to give a sulfonic acid form membrane.

The Ew of this sulfonic acid form membrane was determined by the ion exchange equivalent weight (Ew) measurement method described hereinabove and found to be 720 (g/eq). Measurements made according to the above-mentioned solid state $^{19}$F nuclear magnetic resonance measurement method gave the following results: B/A=∞, X=0 (m=2 in the general formula (II)). Further, this sulfonic acid form membrane was subjected to the above-mentioned Fenton treatment 2. Fluoride ion was found to amount to $13.3 \times 10^{-4}$ parts by mass per 100 parts by mass of the membrane.

Then, using this electrolyte membrane, a membrane/electrode assembly (MEA) was produced according to the method described hereinabove. The fluoropolymer used on that occasion in producing the electrodes was the same polymer as used in the electrolyte membrane, namely the sulfonic acid form polymer derived from the fluoropolymer F not subjected to fluorination.

This MEA was integrated into the cell for evaluation, and the initial characteristics were measured at a cell temperature of 80° C. by the method described hereinabove. The relationship between the voltage (V) and current density (A/cm$^2$) indicated the following: 0.72 V at 0.5 A/cm$^2$, 0.44 V at 1.0 A/cm$^2$ and unworkable at 1.5 A/cm$^2$.

In the durability test at 100° C., the cell stopped working after 85 hours of operation due to crossleak. The fluoride ion concentration in the wastewater after the lapse of 50 hours was 2.8 ppm on the cathode side and, on the anode side, it was 6.1 ppm.

Comparative Example 4

The fluorinated fluoropolymer C obtained in Comparative Example 1 was made into a 50-μm-thick thin membrane by extrusion melt molding at 280° C. using a T die in the same manner as in Example 5. The MI of this fluoropolymer C was 3.2 (g/10 min). This thin membrane was treated in the same manner as in Example 2 to give a sulfonic acid form membrane. The Ew of this sulfonic acid form membrane was determined by the ion exchange equivalent weight (Ew) measurement method described hereinabove and found to be 720 (g/eq). Measurements made according to the above-mentioned solid state $^{19}$F nuclear magnetic resonance measurement method gave the following results: B/A=921, X=6.7 (m=2 in the general formula (II)). Further, this sulfonic acid form membrane was subjected to the above-mentioned Fenton treatment 2. Fluoride ion was found to amount to $12.8 \times 10^{-4}$ parts by mass per 100 parts by mass of the membrane.

Then, using this electrolyte membrane, a membrane/electrode assembly (MEA) was produced according to the method described hereinabove. The fluoropolymer used on that occasion in producing the electrodes was the same polymer as used in the electrolyte membrane, namely the sulfonic acid form polymer derived from the fluoropolymer C.

This MEA was integrated into the cell for evaluation, and the initial characteristics were measured at a cell temperature of 80° C. by the method described hereinabove. The relationship between the voltage (V) and current density (A/cm$^2$) indicated the following: 0.75 V at 0.5 A/cm$^2$, 0.52 V at 1.0 A/cm$^2$ and 0.18 V at 1.5 A/cm$^2$.

In the durability test at 100° C., the cell stopped working after 120 hours of operation due to crossleak. The fluoride ion concentration in the wastewater after the lapse of 50 hours was 1.18 ppm on the cathode side and, on the anode side, it was 2.5 ppm.

INDUSTRIAL APPLICABILITY

The method for a producing a stabilized fluoropolymer of the invention can be used in preparing materials suited for producing membrane materials, such as fuel cell electrolyte membranes, which are to be used under sever conditions.

The stabilized fluoropolymer of the invention is excellent in chemical stability, as mentioned above, and, therefore, the hydrolyzate thereof can be suitably used as electrolyte membranes or like membrane materials or electrodes for use in fuel cells, such as solid polymer electrolyte fuel cells, which are used under very severe conditions and make it possible to obtain highly durable fuel cell membranes or electrodes causing very low levels of fluoride ion concentration in wastewater.

The invention claimed is:

1. A method for producing a stabilized fluoropolymer which comprises producing said stabilized fluoropolymer by subjecting a treatment target substance containing a sulfonic-acid-derived-group-containing fluoropolymer to a fluorination treatment, wherein said sulfonic-acid-derived-group-containing fluoropolymer is a fluoropolymer containing —SO$_3$M (in which M represents H, NR$^1$R$^2$R$^3$R$^4$ or M$^1{}_{1/L}$; R$^1$, R$^2$, R$^3$ and R$^4$ are the same or different and each represents H or an alkyl group containing 1 to 4 carbon atoms; and M$^1$ represents an L-valent metal), and said treatment target substance has a moisture content of not higher than 500 ppm by mass, said method comprising the steps of producing said sulfonic-acid-derived-group-containing fluoropolymer by emulsion polymerization, drying said sulfonic-acid-derived-group-containing fluoropolymer to produce said treatment target substance, and fluorinating said treatment target substance, wherein the sulfonic-acid-derived-group-containing fluoropolymer is a copolymer which is at least binary comprising an acid-derived group-containing perhalovinyl ether represented by the general formula (I):

$$CF_2\!=\!CF\!-\!O\!-\!(CFY^2)_m\text{-}A \qquad (I)$$

(wherein Y$^2$ represents F, Cl, Br or I; m represents an integer of 1 to 5; when m is an integer of 2 to 5, m atoms of Y$^2$ are the same or different; A represents —SO$_2$X or —COZ; X represents F, Cl, Br, I or —NR$^5$R$^6$ and Z represents —NR$^7$R$^8$ or —OR$^9$; R$^5$, R$^6$, R$^7$ and R$^8$ are the same or different and each represents H, an alkali metal element, an alkyl group or a sulfonyl-containing group and R$^9$ represents an alkyl group containing 1 to 4 carbon atoms) and a copolymerizable monomer with said acid-derived group-containing perhalovinyl ether, said copolymerizable monomer is an "other vinyl ether" other than said acid-derived group-containing perhalovinyl ether and an ethylenic monomer, and said copolymer comprises 5 to 40 mole percent of an acid-derived group-containing perhalovinyl ether unit derived from said acid-derived group-containing perhalovinyl ether, 60 to 95 mole percent of an ethylenic monomer unit derived from said ethylenic monomer and 0 to 5 mole percent of an "other vinyl ether unit" derived from said "other vinyl ether".

2. The method for producing a stabilized fluoropolymer according to claim 1, wherein the sulfonic-acid-derived-group-containing fluoropolymer further contains —SO$_2$X and/or —COZ (wherein X represents F, Cl, Br, I or —NR$^5$R$^6$ and Z represents —NR$^7$R$^8$ or —OR$^9$; R$^5$, R$^6$, R$^7$ and R$^8$ are the same or different and each represents H, an alkali metal element, an alkyl group or a sulfonyl-containing group and R$^9$ represents an alkyl group containing 1 to 4 carbon atoms).

3. The method for producing a stabilized fluoropolymer according to claim 1, wherein the sulfonic-acid-derived-group-containing fluoropolymer further contains —COOH at the polymer chain terminus or termini.

4. The method for producing a stabilized fluoropolymer according to claim 1, wherein the fluorination treatment is carried out using a gaseous fluorinating agent comprising a fluorine source, said fluorine source is at least one species selected from the group consisting of F$_2$, SF$_4$, IF$_5$, NF$_3$, PF$_5$, ClF and ClF$_3$ and said fluorine source amounts to not less than 1% by volume of said gaseous fluorinating agent.

5. The method for producing a stabilized fluoropolymer according to claim 4, wherein the fluorine source is F$_2$.

6. The method for producing a stabilized fluoropolymer according to claim 1, wherein Y$^2$ is F and m is 2.

* * * * *